J. G. SHODRON.
FEED TROUGH FOR PIGS AND OTHER ANIMALS.
APPLICATION FILED JUNE 12, 1916.
1,328,970.
Patented Jan. 27, 1920.
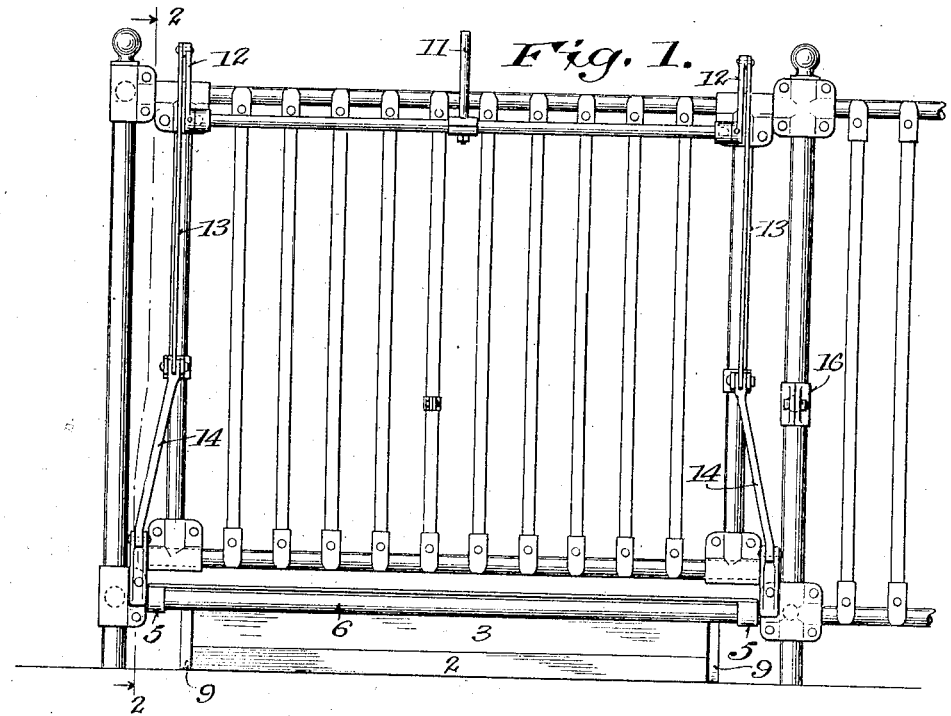
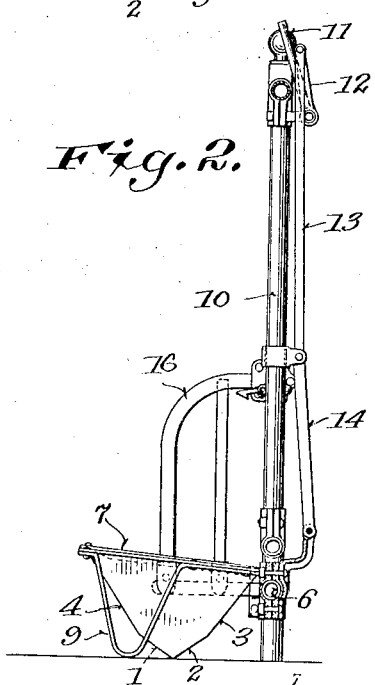
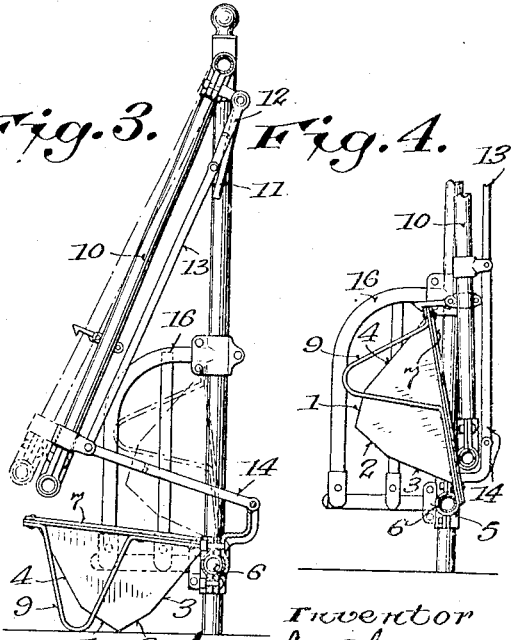
Inventor
John G. Shodron
By Erwin & Wheeler
Attorneys.

UNITED STATES PATENT OFFICE.

JOHN G. SHODRON, OF FORT ATKINSON, WISCONSIN, ASSIGNOR TO JAMES MANUFACTURING COMPANY, OF FORT ATKINSON, WISCONSIN, A CORPORATION OF WISCONSIN.

FEED-TROUGH FOR PIGS AND OTHER ANIMALS.

1,328,970.     Specification of Letters Patent.     Patented Jan. 27, 1920.

Application filed June 12, 1916. Serial No. 103,078.

*To all whom it may concern:*

Be it known that I, JOHN G. SHODRON, a citizen of the United States, residing at the city of Fort Atkinson, county of Jefferson, and State of Wisconsin, have invented new and useful Improvements in Feed-Troughs for Pigs and other Animals, of which the following is a specification.

My invention relates to improvements in feed troughs for pigs and other animals.

My objects are to improve the construction or shape of the trough, whereby liability of injury from the freezing of its contents is avoided, and an animal aided in getting the entire contents of such trough. Also to provide means whereby the trough may be swung to a raised position either within, or outside of the inclosure without permitting the escape of the animals and with the top or open side turned outwardly to facilitate discharging the contents or cleaning the trough.

My invention is further explained by reference to the accompanying drawings, in which—

Figure 1 represents a front view of the animal inclosure provided with my improved trough.

Fig. 2 is a vertical section drawn on line 2, 2 of Fig. 1.

Fig. 3 is a similar view to that shown in Fig. 2, in which a section of the inclosure is indicated by dotted lines in its proper position to permit the trough to be swung to a vertical position exterior to the inclosure, for the purpose mentioned.

Fig. 4 is a detail sectional view illustrating the swinging connection between the trough and frame.

Fig. 5 is a plan view of the trough.

Like parts are referred to by the same reference numerals throughout the several views.

Experience has demonstrated the fact that feed troughs, as heretofore constructed with rounded or rectangular bottoms and sides, some times become broken or distorted by frost when liquid is permitted to freeze in the same. By the construction shown, the bottom and side walls of the trough diverge upwardly and outwardly in such a manner that the contents of the trough when freezing may expand both outwardly and upwardly with a sliding movement along the side walls of the trough, whereby the liability of the trough becoming cracked or broken as heretofore by frost is avoided.

To accomplish this object the bottom portion of the trough is formed with two broadly divergent portions 1 and 2, from the outer margins of which the front and rear sides 3 and 4 extend upwardly and also divergently, although they are less divergent than the bottom portions 1 and 2. The expansion of the freezing liquid is thus permitted to occur both outwardly and upwardly, and with increased freedom when the contents of the trough are shallow, as is usually the case, since the liquid in such troughs usually comprises a small residue. The broad open angle at the bottom also provides the greatest freedom of expansion at the points where the pressure is usually greatest, and where the connections with the end walls 4 and the side walls prevents all the walls from yielding to any great extent, thereby decreasing the danger of a rupture of the walls to a minimum. The form of the bottom also causes the liquid contents to collect along the longitudinal center line and this facilitates the efforts of the animals to completely consume a small residue.

It will be observed that the portions 1 and 2 diverge at an angle of more than 45° from a plane perpendicular to that in which the cross bars 7 are located, whereas the portions 3 and 4 diverge from said plane at angles of less than 45°. Therefore, the portion of the trough between the portions 3 and 4 is wide enough to allow the pigs to insert their heads freely, but at the bottom of the trough, the wall portions 1 and 2 converge in such a manner that liquid will collect along the center line, and even a small quantity of liquid may be readily sucked up by the animal. The outer margins of the portions 1 and 2 are suspended from the top frame by the walls 3 and 4 and by the end walls of the trough. Since the portions 3 and 4 extend in planes more nearly vertical or perpendicular to the top of the trough than the other portions, it is obvious that the outer margins of the portions 1 and 2 cannot be pressed downwardly by the expansion of freezing liquid, and, owing to the broad open angle formed by the walls which have an inclination of more than 45° from a perpendicular line, the force of the expansion will be exerted principally in an upward direction, causing the ice to creep along the walls, instead of bursting them. In fact, there is practically no tendency to burst the walls of my improved trough, unless liquid is allowed to accumulate to a point above the lower margins of the portions 3 and 4.

It will be observed that the outer margin of the trough is connected by collars 5 with a horizontal frame rod 6 forming part of the pen or inclosure. The side walls are braced at intervals by cross bars 7, riveted to their upper margins and adapted to prevent them from spreading. The end walls are provided with supporting brackets 9 which project downwardly to the floor and relieve the narrow central portion of the bottom from the pressure of the trough, its contents and the animals that step into it.

The collars 5 allow the trough to be swung upwardly and outwardly to the positions illustrated by dotted lines in Fig. 3 and by full lines in Fig. 4. The pen illustrated is of a type disclosed and claimed in a companion application bearing even date herewith, Serial No. 103,076, filed by John B. Olson June 12, 1916 and in which a swinging section or panel 10 may be adjusted inwardly by a lever 11 operating through crank arm 12 and link bars 13 and 14 to expose the trough from the exterior side. By adjusting this panel to the dotted line position in which it is shown in Fig. 3, the trough may be raised and swung to a vertical position exterior to the panel. The panel swings between a guard 16, and one end wall of the pen, whereby the animals are prevented from escaping when the panel is swung inwardly. This feature, however, together with the swinging panel, is described and claimed in the companion application and therefore not claimed herein.

Having thus described my invention what I claim as new and desire to secure by Letters Patent, is—

1. A feed trough comprising end, side and bottom walls, having substantially flat downwardly converging side walls, and substantially flat downwardly converging bottom walls disposed in planes oblique to the side walls, and having a greater angle of convergence than the side walls, said bottom walls having a width allowing a sufficient separation of the side walls to facilitate access of the head of an animal to the lowest portion of the trough along the meeting line of the bottom walls, whereby residual accumulations of liquid and resulting ice may be reduced to a minimum, and whereby the expansion of freezing liquid may be permitted along the broadly diverging bottom walls, without injury to the trough.

2. A feed trough for liquids having in combination downwardly converging side walls, connected along their lower margins with bottom wall portions which also converge in oblique planes downwardly to the longitudinal center line of the bottom, in planes which diverge upwardly at a greater angle than the upper portions of the walls, the bottom wall portions being more nearly horizontal than the side wall portions, a pen frame having a trough supporting frame rod, a swinging supporting connection between the outer margin of the trough and said frame rod, and a tilting frame panel adapted to swing inwardly across the trough to a position permitting the trough to be raised to swing outwardly exterior to said panel.

In testimony whereof I affix my signature in the presence of two witnesses.

JOHN G. SHODRON.

Witnesses:
ROBT. J. PARKS,
A. G. CRERAR.